United States Patent [19]

Miller

[11] Patent Number: 4,490,793
[45] Date of Patent: Dec. 25, 1984

[54] CRUISE SPEED CONTROL FOR AIRCRAFT PERFORMANCE MANAGEMENT SYSTEM

[75] Inventor: Harry Miller, Scottsdale, Ariz.

[73] Assignee: Sperry Corporation, New York, N.Y.

[21] Appl. No.: 332,901

[22] Filed: Dec. 21, 1981

[51] Int. Cl.³ .............................................. G06F 15/14
[52] U.S. Cl. .................................... 364/433; 244/181
[58] Field of Search ................... 364/433, 431.07, 442, 364/440, 435; 244/181, 182, 180

[56] References Cited

U.S. PATENT DOCUMENTS

| | | | |
|---|---|---|---|
| 2,933,268 | 4/1960 | Jude et al. | 244/181 |
| 3,691,356 | 9/1972 | Miller | 364/435 |
| 4,044,975 | 8/1977 | Blocher | 364/435 |
| 4,159,088 | 6/1979 | Cosley | 364/442 |
| 4,266,743 | 5/1981 | Kelley | 344/182 |
| 4,277,041 | 7/1981 | Marrs et al. | 364/440 |
| 4,325,123 | 4/1982 | Graham et al. | 364/442 |
| 4,357,663 | 11/1982 | Robbins et al. | 364/433 |

Primary Examiner—Jerry Smith
Assistant Examiner—Michael R. Fleming
Attorney, Agent, or Firm—Howard P. Terry; Albert B. Cooper

[57] ABSTRACT

A cruise speed control apparatus in an aircraft performance management system wherein target Mach command is supplied to the engine automatic throttle controls to establish an engine thrust to overcome and equate to the aircraft nominal drag characteristics at that commanded Mach speed and simultaneously the difference between the actual Mach number speed and the target Mach command speed is supplied to the automatic pilot pitch axis control to cause the aircraft to maintain the commanded Mach speed through change in pitch attitude and altitude. The integral of any altitude standoff is used to adjust required thrust to achieve the commanded Mach target and reduce the standoff to zero. If necessary, filtered altitude error may be used to provide dynamic damping of the throttle control loop and compensation for long term degradation in the aircraft's drag characteristic with time is provided by measuring the drag degradation ratio and adjusting the target Mach command in accordance therewith.

22 Claims, 4 Drawing Figures

CRUISE SPEED CONTROL FOR AIRCRAFT PERFORMANCE MANAGEMENT SYSTEM

BACKGROUND OF THE INVENTION

1. Field of the Invention

The present invention relates generally to aircraft control systems and more particularly to aircraft performance management systems for controlling the aircraft vertical flight profile through the coordinated operation of the engine throttles and pitch attitude to thereby provide the most cost effective operation of the aircraft.

2. Description of the Prior Art

Most modern commercial transport aircraft, many general aviation aircraft and certain military aircraft include automatic flight control systems and/or flight director systems, for controlling the aircraft attitude and flight path as well as automatic throttle control systems for controlling aircraft thrust. For many years these two systems have been operated more or less independently or coordinated only during certain phases of flight, such as for example during take-off and landing operations, the primary consideration being aircraft controllability and safety rather than operating costs. However, in view of the recent substantial increases in fuel costs, aircraft operators are very desirous of increasing fuel efficiencies throughout the entire vertical flight profile of their flight plans by assuring the most cost effective operations possible. Coordination between the automatic throttle controls and the automatic pitch attitude flight controls have been carefully analyzed in attempts to achieve these results. Recently developed systems, resulting in this coordinated automatic thrust/attitude control for aircraft have been termed flight management or performance management systems. In general, such systems compute and control thrust and pitch parameters to achieve minimum fuel consumption within the constraints of scheduled trip time between the start of the take-off run to touchdown at the destination. A particular objective of such systems is to obtain smooth, stable and accurate control during cruise and when the automatic system commands the aircraft to accelerate, decelerate or change its flight path in the vertical plane.

At normal high altitude cruise speeds selected or computed for optimum fuel economy, modern, low drag aircraft tend to have an almost neutral speed stability; that is, small changes in engine thrust or engine pressure ratio (EPR) produce large changes in Mach number speed, or conversely, Mach speed is very sensitive to small changes in the engine throttle. Manual control of EPR to maintain the fuel efficient Mach speed is difficult since it requires constant pilot attention. Commanding a higher or lower Mach speed at which the aircraft is more speed stable is inefficient in terms of fuel consumption. In some prior art speed control systems, the error between commanded Mach and actual Mach was used to control EPR. This type of system is not fully satisfactory and produced speed hunting because of the above inherent neutral speed stability. If the system gains were lowered to reduce hunting, the control was overly sluggish and/or inaccurate. One attempt in the prior art to overcome the neutral speed stability problem at cruise speeds is disclosed in U.S. Pat. No. 4,277,041. In this system Mach error, Mach integral and the rate of change of actual Mach are used to control the autothrottle or EPR but in addition, actual Mach rate or washed out actual Mach is supplied to the autopilot pitch channel causing a temporary altitude error. This short term Mach to autopilot pitch allows short term variations in speed to be controlled by changes in altitude (pitch) rather than by throttle activity which is reflected in throttle movement and is distracting to the flight crew and wasteful of fuel. One of the difficulties with this prior cruise control configuration is that the basic airspeed terms, Mach error, Mach rate or pseudo rate, and Mach error integral are still used directly in the throttle control loop, which can still result in excessive throttle activity and excessive fuel consumption. If the integral term only is used, as in turbulence, loss of precise speed control will result.

It is also recognized that there have been other aircraft control systems involving the cross feed of throttle control signals to the pitch autopilot. One of these is Applicant's Assignee's U.S. Pat. No. 2,933,268 issued to Jude et al. In this patent airspeed error and error rate are used to position the aircraft throttles so as to maintain a selected airspeed. At the same time a throttle position signal is cross fed to the pitch channel of the autopilot, operable in a glide slope hold or altitude hold mode to anticipate and prevent any flight path change due to throttle changes. In the cruise speed control described in this patent, the throttle control system has the dual function of controlling throttles and vernier changes in altitude while the autopilot pitch channel has the dual function of controlling altitude and vernier changes in speed. The Jude et al system does not address the speed stability problem associated with fuel efficient cruise control and will not solve the excessive throttle activity problem solved by the present invention.

SUMMARY OF THE INVENTION

The present invention is directed to the cruise mode of operation of a performance management system and is a basically different approach to solving the problem of inherent aircraft speed instability at optimum cruise Mach speeds and overcomes the disadvantages and shortcomings of prior cruise speed control systems. In general, during this mode of operation, a desired and usually automatically commanded, fuel efficient cruise airspeed, usually expressed in terms of Mach number and hereinafter designated as Mach target ($M_{TGT}$), is applied to both the automatic throttle control system and to the pitch channel of the automatic pilot and/or flight director system. The $M_{TGT}$ signal to the autothrottle is used to compute and establish an engine pressure ratio (EPR) or engine fan speed ($N_1$) required to produce the thrust component sufficient to overcome the drag impact at that $M_{TGT}$, while the difference between the same $M_{TGT}$ signal and an actual Mach signal is supplied to the autopilot to pitch the aircraft so as to maintain the Mach speed. Any resulting long term change in altitude is then used to adjust the thrust required to return the aircraft to its original altitude. Stated in terms of aerodynamic lift and thrust forces acting on the aircraft in essentially steady state cruise flight, the present invention uses generally short term changes in the direction of the aircraft lift vector to provide a vernier control of aircraft speed and generally long term changes in the total energy of the aircraft to provide vernier control of aircraft altitude. Expressed in terms of aircraft control parameters, the invention provides aircraft speed control apparatus including means responsive to the difference between a Mach target speed and actual Mach speed for providing vernier speed control through control of aircraft pitch attitude and means responsive to departures from a reference altitude for providing vernier control of thrust to maintain the altitude. In other of its aspects, the present invention provides compensation for any long term degradation in the drag characteristics of the aircraft.

DESCRIPTION OF THE PREFERRED EMBODIMENT

Figure 1A:
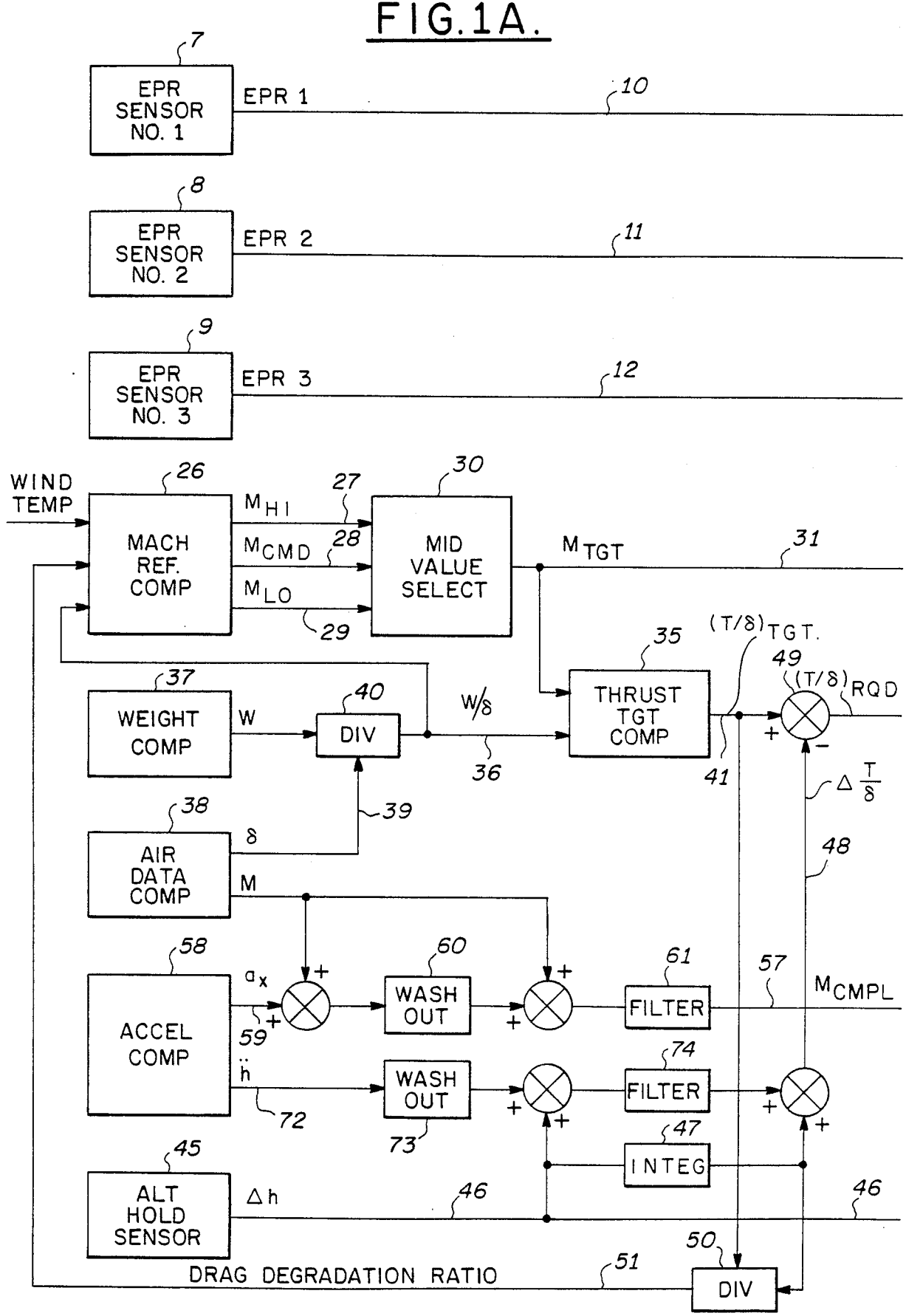
FIG. 1 of the drawings illustrates a preferred embodiment of the present invention and constitutes a block diagram of that apparatus active in a cruise control mode of a complete aircraft performance management system.
Figure 1B:
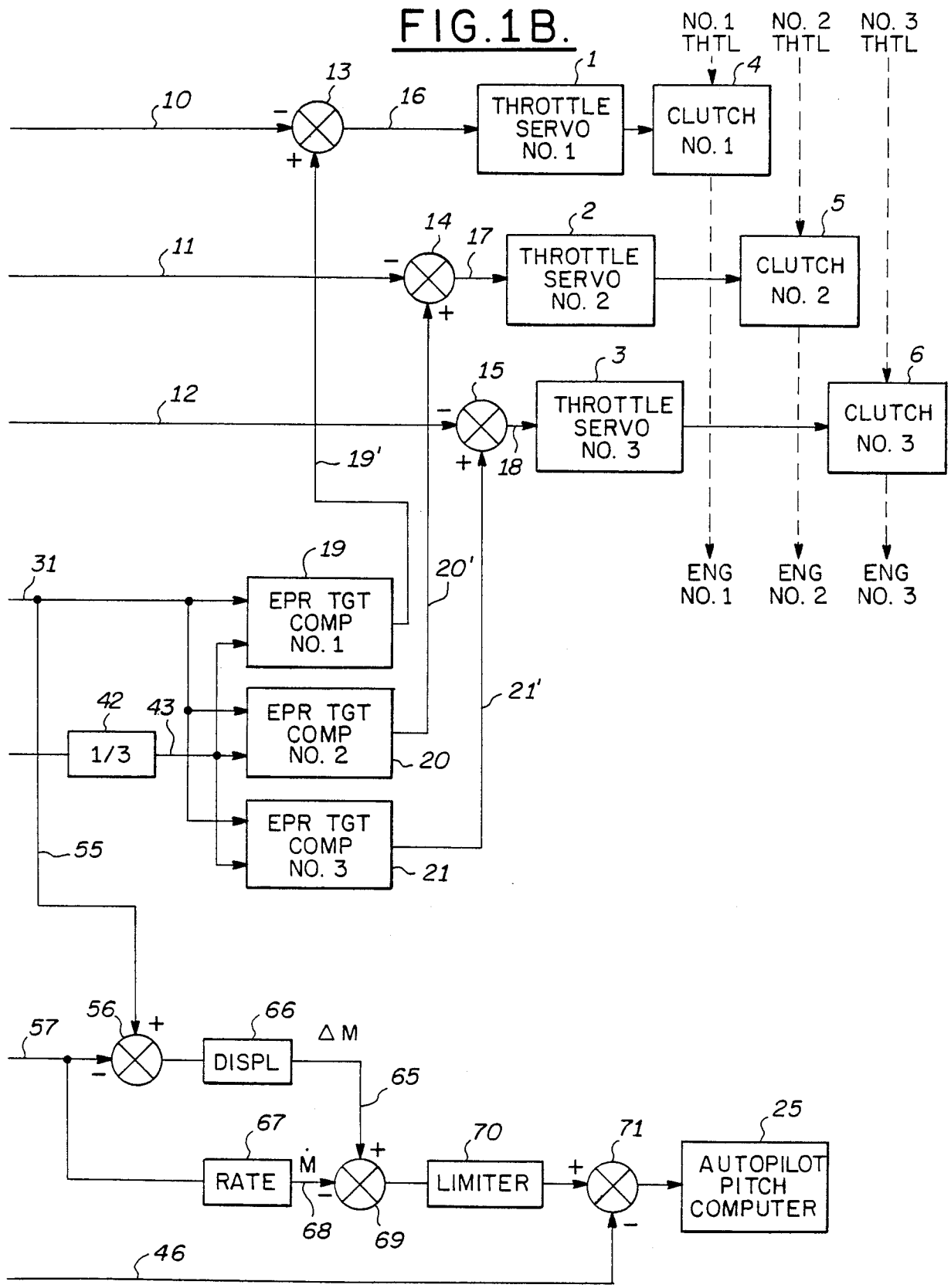

Referring to FIG. 1, the aircraft apparatus involved in producing or controlling the aerodynamic forces acting on the aircraft includes an automatic throttle control system for controlling aircraft thrust through the engines and an automatic flight control system for controlling the pitch attitude of the craft through the elevators.

In the illustrated embodiment, the aircraft is a typical three turbojet engine transport having conventional three throttle servomotor controls 1, 2, 3 which operate the respective throttle linkages through conventional no-back clutch mechanisms 4, 5, 6 which may be of the type disclosed in the present inventor's U.S. Pat. No. 3,505,912 assigned to the present assignee. The throttle servos are each controlled from respective conventional engine pressure ratio sensors 7, 8, 9 via leads 10, 11, 12, summing junctions 13, 14, 15 and leads 16, 17, 18, the latter representing EPR error signals which are the difference between the actual engine EPR's and the EPR references or EPR targets computed in computers 19, 20, 21 as will be described below. Thus, in conventional fashion, the engine throttles are automatically controlled so as to establish and maintain the actual engine EPR's at their desired reference or target EPR. The autothrottle control system also includes EPR limits which establish the maximum EPR at which the engines are allowed to operate under existing ambient temperatures, atmospheric pressure, etc., as established by the engine and aircraft manufacturers. However, since EPR settings for cruise are normally well below these limits, the EPR limits are not illustrated. As is well known, EPR provides a measure of the thrust the engines impart to the aircraft and this characteristic is described in the present inventor's U.S. Pat. No. 4,110,605 also assigned to the present assignee.

The automatic flight control system is entirely conventional. As is well known, it includes gyroscopic references, roll, pitch, and yaw computers and pitch, roll and yaw control surface servomotors for controlling these control surfaces to in turn control the attitude and flight path of the aircraft. A typical autopilot is disclosed in the present inventor's U.S. Pat. No. 2,998,946. For purposes of the present invention only the pitch control computer 25 is illustrated and constitutes a means for controlling the pitch attitude of the aircraft. As shown in detail in the referenced '946 patent, the autopilot includes an altitude hold mode. In this mode an altitude deviation sensor supplies an altitude error signal to the autopilot 25 pitch channel which pitches the aircraft up or down in order to reduce the altitude error to zero.

In accordance with the present invention an optimum or most economical reference or target Mach number cruise speed $M_{TGT}$ is computed by the performance management system Mach reference computer 26 which target is based on existing measurable and known flight parameters including aircraft weight and drag characteristics and external parameters including pressure altitude, air temperature and winds. Various reference cruise speeds may be computed depending on desired over-all economy goals such as maximum cruise speed, economy cruise speed, maximum range cruise speed and the like.

These various Mach reference speeds and the relationship of the aircraft and aerodynamic parameters involved in computing the same are described in Report No. NASA TM-78519 entitled "Characteristics of Constrained Optimum Trajectories with Specified Range" by Heintz, Erzberger and Homer Lee, Ames Research Center, Moffett Field, Calif. 94035. Alternatively, of course, the desired or target Mach cruise speed may be set by the pilot through a conventional speed set knob and readout. The Mach reference computer 26 provides three outputs 27, 28, 29; the high and low limit signals on leads 27 and 29 provide buffet protection and together with mid-value selector 30 assures that the control system operates between the high and low limits. Thus, the output of mid-value selector 30 on lead 31 is the system Mach target speed and the Mach reference computer 26 and mid-value selector constitute a means for providing a signal representing a reference cruise speed or Mach target speed for the aircraft.

The Mach target signal on lead 31 is supplied as one input to the EPR target computers 19, 20 and 21 for each of the aircraft's engines. The other inputs to each of the EPR target computers is each engine's contribution to the total thrust required to be imparted to the aircraft to overcome the aircraft's drag at the reference or target Mach number and altitude. The latter signal is generated by the thrust target computer 35 which is responsive to the Mach target signal on lead 31 and a signal on lead 36 proportional to the weight of the aircraft as computed by a weight computer 37. Since the actual weight term required by the thrust target computer 35 is the actual weight to pressure altitude ratio $W/\delta$, the pressure altitude factor $\delta$ is obtained from conventional air data computer 38 on lead 39 and is supplied to divider 40 so that the weight signal on lead 36 is the required $W/\delta$ signal for thrust target computer 35.

The weight computer 37 may be apparatus responsive to the manifest weight modified by fuel flow in conventional fashion or may be of the type disclosed in the above-referenced U.S. Pat. No. 4,110,605. However, a preferred weight computer may be of the type disclosed in the present inventor's copending patent application Ser. No. 333,097, filed Dec. 21, 1981 entitled "On Route Weight Computer for Aircraft".

Figure 2:
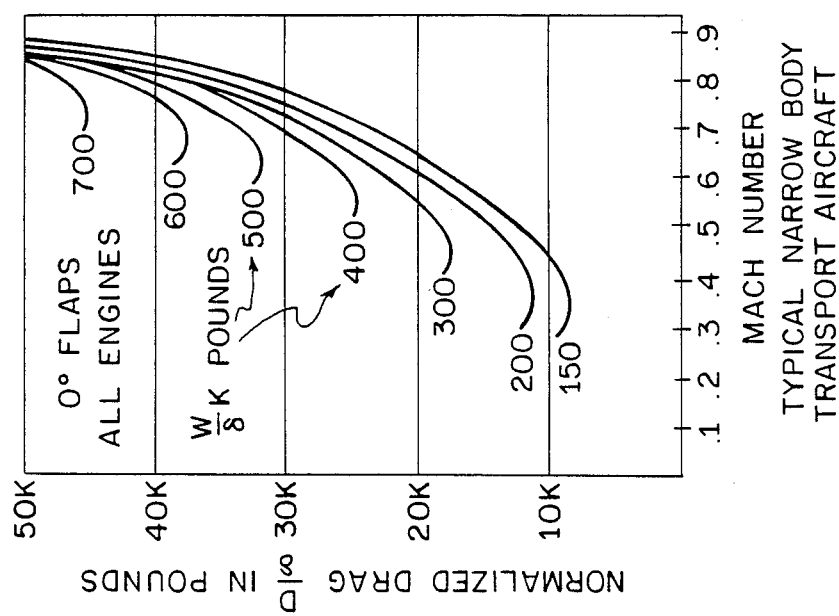
FIG. 2 graphically illustrates the thrust required to overcome aircraft drag at a desired Mach cruise speed for a typical jet transport aircraft.

The thrust target signal computation is performed preferably by entirely conventional analog or digital techniques. Within the computer 35 is stored the data illustrated graphically in FIG. 2. For example, if a digital computer is used, this graphical data is suitably coded and stored in a digital PROM. The computer 35 receives the $M_{TGT}$ and $W/\delta$ signals, which signals are used conventionally to address the PROM to determine the aircraft drag term $D/\delta$ corresponding thereto. Since in the cruise mode the thrust must be equal to the drag, the $D/\delta$ term is the required $T/\delta$ for the aircraft to maintain the Mach target for the existing weight and cruise altitude. For example, if the desired Mach target is 0.68 and the existing aircraft $W/\delta$ is 400,000 pounds, the required target $T/\delta$ is 30,000 pounds. Thus, the output of computer 35 on lead 41 is a signal proportional to the thrust target $(T/\delta)_{TGT}$. This signal is divided by the number of engines, in the present illustration 3, by divider 42 and supplied to EPR computers 19, 20 and 21 through lead 43. It should be recognized that the PROM data is nominal data derived from flight test of a new aircraft and engines which data will vary with age. As will be seen below, the present invention compensates for any changes in or departures from this nominal data.

Figure 3:
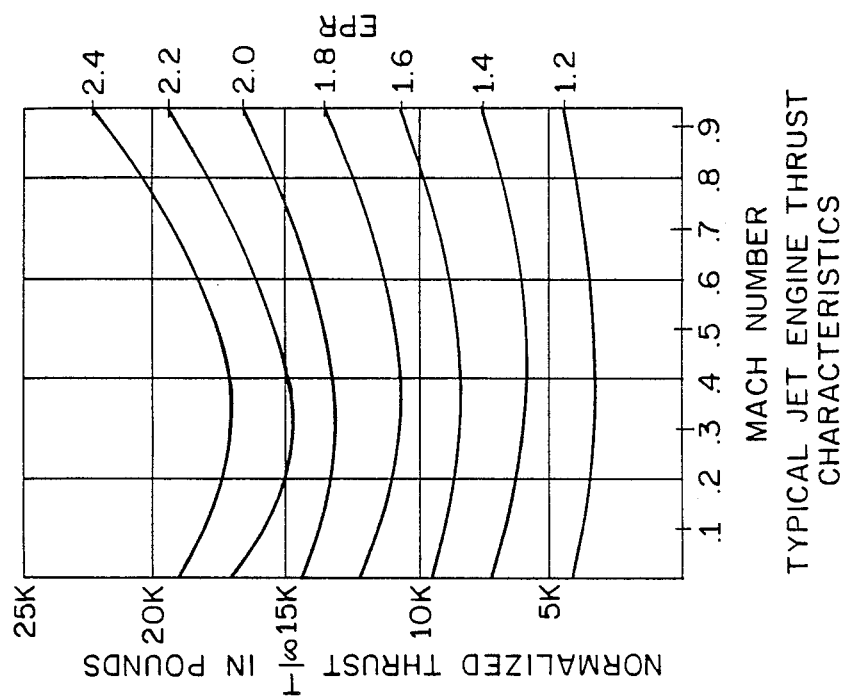
FIG. 3 graphically illustrates the engine pressure ratio (EPR) required to produce a target thrust at a desired Mach cruise speed for one engine of a typical jet transport aircraft.

Each of the EPR target computers 19, 20 and 21 are the same and operate in the same manner as the thrust target computer 35. Within each EPR target computer is stored the data illustrated graphically in FIG. 3. Again, if a digital computer is used, this graphical data, one set for each aircraft engine, is stored in a digital PROM. Each computer receives the $M_{TGT}$ and $(T/\delta)_{TGT}$ signals, which signals are used conventionally to address the appropriate PROM to determine the corresponding EPR target. For example, if the desired $M_{TGT}$ is 0.68 and the total $(T/\delta)_{TGT}$ is 30,000, and assuming all engines are identical, each engine will have to supply 10,000 pounds and the EPR target for each engine would be 1.68. Thus, the output signal of each EPR TGT computer on leads 19', 20' and 21' are supplied to the summing junctions 13, 14 and 15 as described above.

Let us assume that through airframe modification, extensive use, overhaul and the like, its drag characteristics have departed from nominal, for example, has increased. In such case, the computed thrust target being based on nominal drag data will be lower than required to sustain the aircraft weight at the target Mach and the aircraft will slowly lose altitude. This altitude error is sensed by an altitude hold sensor 45 providing a signal on lead 46 proportional thereto. In accordance with a feature of the present invention, this altitude error signal is integrated through integrator 47, the output of which is supplied via lead 48 to the summing junction 49 where it slowly increases the thrust target signal on lead 41 (the altitude error signal is negative) to that required to sustain the aircraft weight at the cruise altitude and Mach target speed.

It will be noted from the above discussion that in that situation the altitude integral signal on lead 48 is due to a departure of the aircraft's drag characteristics from nominal. In accordance with another feature of the invention and since such drag degradation is characteristic for that particular aircraft, this integral signal is used together with the nominal value of the drag characteristic, as represented by the signal on lead 41 and divider 50, to generate on lead 51 a signal proportional to the ratio of these signals; that is, the drag degradation ratio of the aircraft. This signal is therefore used to compensate for the change in drag by inserting it as a more or less permanent bias into the Mach reference computer so that future Mach target signals will be consistent with the actual drag characteristics for that particular aircraft.

Returning now to the basic cruise Mach control system, the engine throttles have been set so that the engines provide the thrust necessary to overcome drag at the reference Mach target or cruise speed at the cruise altitude as commanded by the signal on lead 31. In accordance with the present invention, this signal, which is essentially a displacement command signal, is also supplied via lead 55 to the autopilot 25 pitch channel, which in cruise is normally in an altitude hold mode. In this mode, the altitude hold sensor 45 (which may be part of the autopilot or part of the performance management system and controlled by conventional intersystem switching) provides a signal to the autopilot upon departure from the cruise altitude to pitch the aircraft up or down in order to reduce the altitude error signal to zero and return the aircraft to its reference cruise altitude. The Mach target signal on lead 55 is compared at summing junction 56 with a signal on lead 57 proportional to the actual Mach number speed of the aircraft. The actual Mach signal is derived from the air data computer 38 and may be conventionally complemented with a longitudinal acceleration signal from a conventional acceleration computer 58 on lead 59, washout 60 and filter 61 to provide a smooth and lag-free measure of the actual Mach number of the aircraft.

The difference between the actual Mach signal and the commanded Mach target signal is the Mach error signal $\Delta M$ on lead 65 which may gain adjusted through a displacement gain element 66. A signal proportional to the rate of change of actual Mach on lead 68 is derived through a rate taker 67 responsive to the actual Mach signal on lead 57 and combined at summing junction 69 with the Mach error signal on lead 65 and the resultant thereof processed through limiter 70 (to protect against excessive pitch atitude commands) and combined with the altitude deviation or altitude error signal on lead 46 at summing junction 71 and transmitted to the autopilot pitch computer 25.

As discussed at the outset, it is a principle object of the present invention to provide a fuel efficient Mach cruise control system wherein the commanded Mach speed is automatically maintained with minimum throttle activity. The above-described cruise speed control system accomplishes this by providing vernier control of speed through controlling the direction of the aircraft lift vector and providing vernier control of altitude by controlling the total energy of the aircraft by adding or subtracting thrust. It will be noted that the generally short term speed signals $\Delta M$ and $\dot{M}$ are controlled through the control of pitch attitude and that only long term speed signals $M_{TGT}$, $T/\delta$ and $\Delta T/\delta$ are controlled through the control of the throttles thus, providing the desired accuracy and minimization of throttle activity.

Accordingly, the operation of the system may be best understood by first assuming that the aircraft has achieved the desired or selected cruise altitude, the throttles have been set to achieve the cruise Mach for the existing aircraft weight at that altitude and the autopilot has been engaged in the altitude hold mode to automatically hold the selected cruise altitude. Now assume that a disturbance is encountered which results in a reduction in the actual Mach speed. This speed reduction is sensed by the air data computer 38 and acceleration computer 58 resulting in a change in the complemented actual Mach signal on lead 57 thereby producing a Mach error signal on lead 65. This error signal is applied to the autopilot as if it were an altitude error command and in a sense to decrease altitude; that is, to pitch the craft downward. As a result the craft tends to increase its speed in order to reduce the Mach error to zero. As the Mach error is reduced, the pitch command decreases and when the Mach error returns to zero, the pitch attitude returns to zero in order to maintain the commanded Mach speed. The Mach rate term from rate taker 67 provides a damping function for the speed control-on-pitch control loop. Note that the Mach error term provides the pitch command function while the Mach rate term provides the loop damping function and that neither of these relatively short term functions reach the throttle control loop.

Although the Mach error has been reduced to zero, an altitude error has been accumulated and while this error appears as a signal on lead 46 tending to return the aircraft to its original altitude, it alone cannot do this because it requires a pitch up of the aircraft and a corresponding reduction in Mach speed which will be opposed by the thus generated Mach error, as described above. Furthermore, while the Mach target has been satisfied, the aircraft is at a different altitude in order to satisfy the disturbance. In order to reduce the altitude standoff, the persistent altitude error signal on lead 46 is integrated through integrator 47 and the resultant is used to adjust the thrust target command through lead 48 to thereby increase the aircraft total energy and thereby return the aircraft to its original cruise altitude and the actual Mach speed to its target value.

Depending upon the aerodynamics and engine characteristics of a particular aircraft, it may be desired to quicken the throttle response by inserting a filtered altitude error signal on lead 46. To improve the quality of the altitude error term it may be complemented with a vertical acceleration signal on lead 72 from acceleration computer 58 through washout 73 and filter 74 in a conventional fashion. The degree of quickening may be provided by suitable gain adjustment, not shown, and may be completely eliminated by reducing such gain to zero when not required. It should be noted that the altitude error displacement gain also provides a damping signal for the altitude integral signal.

It is significant to note that in the present invention there are no high frequency or short term signals used as primary commands to either the autopilot or the autothrottle, and particularly not to the autothrottle, so that all aircraft controls are smooth, resulting in good passenger comfort.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A speed control system for aircraft having an automatic throttle control means for controlling the thrust imparted to the aircraft and an automatic altitude control means for controlling aircraft pitch attitude to maintain a selected altitude comprising:

means for providing a speed reference signal, means for providing a signal representing actual speed, means responsive to said signals for providing a speed error signal proportional to a difference between said speed reference signal and said actual speed signal, means for providing an altitude reference signal.

means for providing a signal representing actual altitude, means responsive to said altitude reference and said actual altitude signals for providing an altitude error signal proportional to a difference between said altitude signals and for supplying said altitude error signal to said throttle control means to correct for minor altitude errors by biasing said altitude reference signal in a sense to reduce said altitude error signal to zero, and means for supplying said speed reference signal to said throttle control means and for supplying said speed error signal and said altitude error signal to said altitude control means for correcting minor speed deviations by biasing said altitude reference signal in a sense to reduce said speed error toward zero.

2. The system set forth in claim 1 further including:

means coupled to said actual speed signal means for providing a first damping signal, and means for supplying said first damping signal to said altitude control means.

3. The system as set forth in claim 2 wherein said first damping signal comprises a signal proportional to the rate of change of said actual aircraft speed.

4. The system as set forth in claim 3 further including:

means for providing a second damping signal, and means for supplying said second damping signal to said throttle control means.

5. The system as set forth in claim 4 wherein said second damping signal comprises said altitude error signal.

6. The system as set forth in claim 1 further including:

means coupled to said altitude error signal means for providing an altitude error integral signal, and means for supplying said altitude error integral signal to said throttle control means.

7. The system as set forth in claim 6 wherein said throttle control means includes:

means for providing a thrust reference signal proportional to a value of thrust required to overcome drag for an existing aircraft weight at a reference speed and altitude corresponding to said reference speed and altitude signals and means responsive to said altitude error integral signal for modifying said thrust reference signal in a sense to reduce said altitude error signal to zero.

8. The system as set forth in claim 7 wherein said means for providing said thrust reference signal includes:

computer means including storage means for storing nominal values of aircraft drag as a function of aircraft weight and reference speed, means for supplying a signal proportional to said weight of the aircraft, and means for supplying said weight signal and said speed reference signal to said computer means for supplying said thrust reference signal.

9. The system as set forth in claim 8 further including:

means responsive to said thrust reference signal and said altitude integral signal for providing a drag degradation signal, and means for supplying said drag degradation signal to said speed reference signal providing means for modifying said speed reference signal in accordance therewith.

10. A cruise speed control system for an aircraft having engines for controlling the thrust imparted to the aircraft and an elevator for controlling the pitch attitude of the aircraft, said system comprising:
- an automatic throttle control for controlling said aircraft thrust to maintain a reference speed,
- an automatic altitude control for controlling said aircraft pitch to maintain a reference altitude,
- reference speed signal generating means,
- actual speed signal generating means,
- reference altitude signal generating means,
- actual altitude signal generating means,
- means responsive to said reference and actual speed signals for providing a speed error signal,
- means responsive to said reference and actual altitude signals for providing an altitude error signal,
- means for supplying said reference speed signal to said automatic throttle control,
- means for supplying the difference between said reference altitude and actual altitude signals to said automatic altitude control, and
- means also supplying the difference between said reference speed and actual speed signals to said automatic altitude control for correcting minor speed deviations by biasing said reference altitude in a sense to pitch the aircraft in a direction to reduce any difference between said reference and actual speed signals to zero.

11. The cruise speed control system as set forth in claim 10 further including:
- integrator means responsive to the difference between said reference and actual altitude signals for providing a signal proportional to the time integral thereof, and
- means for supplying said integral signal to said automatic throttle control to correct for minor altitude deviations by adjusting aircraft thrust in a sense to reduce any difference between said reference and actual altitude signals to zero.

12. The cruise speed control system as set forth in claim 10 further including:
- means responsive to said actual speed signal for providing a signal proportional to the rate of change thereof, and
- means for supplying said speed rate signal to said automatic altitude control for damping the operation thereof.

13. The cruise speed control system as set forth in claim 10 further including:
- means further supplying the difference between said reference and actual altitude signals to said automatic throttle control for damping the operation thereof.

14. The cruise speed control system as set forth in any one of claims 10 through 13 further including:
- means for providing signal proportional to the longitudinal acceleration of said aircraft, and
- complementary filter means responsive to said longitudinal acceleration signal and said actual speed signal to provide a lag-free signal indicative of actual speed with changes in longitudinal acceleration.

15. The cruise speed control system as set forth in any one of said claims 10 through 13 further including:
- means for providing a signal proportional to the vertical acceleration of said aircraft, and
- complementary filter means responsive to said vertical acceleration signal and said difference between said reference and actual altitude signals for varying the speed of response of said throttle control.

16. An aircraft speed control system for controlling an aircraft engine through a throttle control mechanism and including means for controlling aircraft pitch attitude to maintain a selected altitude comprising:
- means for providing a speed error signal which is the difference between an actual and commanded speed signal,
- means for providing an altitude error signal which is the difference between an actual and commanded altitude signal,
- means operatively coupled to said commanded speed signal to produce a thrust component to control aircraft speed through said engine and throttle control mechanism, and
- means operatively coupled to said altitude error and speed error signals and to said pitch means to correct short term small speed errors by varying aircraft altitude.

17. The system of claim 16 further comprising means for determining the integral of said altitude error operatively coupled to said throttle control mechanism to control long term altitude standoffs.

18. The system of claim 16 further comprising means for generating a speed rate signal from said actual speed signal and means for combining said speed rate signal and said speed error signal in said pitch means for damping the pitch response to said speed error signal.

19. The system of claim 16 further comprising means operatively coupled to said engine and throttle control mechanism and responsive to said altitude error signal to control aircraft speed.

20. A cruise Mach number speed control system for an aircraft having turbojet engines for controlling the thrust imparted to the aircraft and elevators for controlling the pitch attitude of the aircraft comprising:
- automatic engine throttle control means operatively coupled to said engines and responsive to a signal proportional to the error between a reference EPR signal and an actual EPR signal,
- Mach speed reference computer means for providing a signal proportional to the desired cruise Mach speed of the aircraft,
- thrust reference computer means coupled to said engine throttle control means and responsive to said Mach reference signal for providing a signal proportional to the thrust required of said engines to overcome the aircraft drag at said reference Mach speed at a reference altitude,
- EPR reference computer means responsive to said required thrust signal and said desired Mach speed signal for supplying said reference EPR signal,
- automatic altitude control means coupled to said elevators and responsive to a signal proportional to an altitude error signal derived from a signal proportional to said reference altitude and an actual altitude signal, and
- means responsive to the difference between said Mach speed reference signal and an actual Mach speed signal for combining said difference signal with said altitude error signal and further controlling said automatic altitude control means.

21. The control system as set forth in claim 20 further comprising:
  means responsive to said actual Mach speed signal for providing a signal varying in accordance with the rate of change thereof, and
  means for supplying said Mach rate signal to said automatic altitude control means whereby to damp the operation thereof.

22. The control system as set for in claim 20 further comprising:
  integrator means responsive to said altitude error signal for providing a signal varying in accordance with the time integral thereof, and
  means responsive to said integral signal operatively coupled to said thrust reference computer means for varying said required thrust signal in accordance therewith in a sense to reduce said altitude error signal to zero.

* * * * *